United States Patent [19]
Oh

[11] Patent Number: 5,438,472
[45] Date of Patent: Aug. 1, 1995

[54] MAGNETIC TAPE CASSETTE WITH AN IMPROVED REEL SPRING

[75] Inventor: Ju-Yeol Oh, Chungcheongnam-Do, Rep. of Korea

[73] Assignee: SKC Limited, Rep. of Korea

[21] Appl. No.: 260,952

[22] Filed: Jun. 16, 1994

[30] Foreign Application Priority Data

Jun. 26, 1993 [KR] Rep. of Korea .................. 93-11426

[51] Int. Cl.6 .............................................. G11B 23/02
[52] U.S. Cl. ................................................... 360/132
[58] Field of Search ............... 360/132; 242/341, 345.2

[56] References Cited

U.S. PATENT DOCUMENTS

| | | |
|---|---|---|
| 4,368,860 | 1/1983 | Goto . |
| 4,496,118 | 1/1985 | Oishi et al. . |
| 4,662,579 | 5/1987 | Gelardi .............................. 360/132 |
| 5,094,434 | 3/1992 | Ryu ..................................... 360/132 |
| 5,326,048 | 7/1994 | Kim ..................................... 360/132 |

*Primary Examiner*—A. J. Heinz
*Attorney, Agent, or Firm*—Finnegan, Henderson, Farabow, Garrett & Dunner

[57] ABSTRACT

A pressure spring for urging the reels toward the lower cassette casing of a magnetic tape cassette includes a central base portion secured to the upper casing, opposite end portions adapted for engaging the reels, and canted middle portions defined between the central base portion and the opposite end portions. Each of the middle portions joins to the central base portion at its proximal end and to the opposite end portions at its distal end. In accordance with the invention, the pressure spring further comprises a pair of laterally extending rib groups each formed along a limited length of the middle portions in close proximity with the central base portion to face the upper cassette casing.

6 Claims, 3 Drawing Sheets

MAGNETIC TAPE CASSETTE WITH AN IMPROVED REEL SPRING

FIELD OF THE INVENTION

The present invention relates to a magnetic tape cassette for use in a tape recorder and; more particularly, to a tape cassette having a pressure spring for the downward biasing of the reels received therein.

DESCRIPTION OF THE PRIOR ART

As is well known, a typical magnetic tape cassette has an upper and a lower cassette casings joined with each other along their peripheral edges to accommodate a pair of magnetic tape reels therein. The tape reels are designed to come into engagement with drive shafts of a tape recorder so that they may be able to rotate in a "floating" state. To prevent the reels from rotating in an unstable manner and enable the tape to run in a uniform fashion, the tape cassette, therefore, is generally provided with an elastic pressure spring which is secured to the upper casing so as to exert a downward force toward the reels.

U.S. Pat. No. 4,496,118 issued to Kengo Oishi and Osamu Suzuki teaches a magnetic tape cassette which carries a reel retaining plate spring fixedly secured to the upper casing in alignment with a photo-sensor insertion hole. Although this cassette provides an improvement in the fixability of the reel retaining plate spring, free ends thereof might be deformed to an extent that intermediate portions thereof may obstruct the running of the tape by their contact with the reels.

In order to overcome the above problem, there has been proposed an improved magnetic tape cassette in U.S. Pat. No. 4,368,860 issued to Shinichi Goto, which is provided with a recess defined on the undersurface of the upper casing for accommodating the fixed part of a spring member. And yet, the cassette has a disadvantage in that a greater magnitude of pressure force is required to properly depress the spring member than would be needed in the '118 patent, which would otherwise cause the reels housed in the cassette to contact with a sleeve portion of the top case.

While the above described drawbacks can be minimized or eliminated by way of increasing the strength of the spring, however, it may lead to a decreased resilience or restoring force of the pressure spring and/or necessitate the use of an increased amount of spring material. Therefore, needs have continued to exist for a pressure spring which has an increased strength, while not impairing the restoring force thereof. In addition, it would be further preferable that the pressure spring be made of an inexpensive material, to thereby save the manufacturing cost of the tape cassette.

SUMMARY OF THE INVENTION

Accordingly, it is an object of the present invention to provide a magnetic tape cassette which substantially eliminates the drawbacks of the prior art tape cassettes noted above and which is able to rotatably support a pair of reels received therein in a reliable manner.

Another object of the invention is to provide an improved pressure spring which can act to resiliently bias the reels without being liable to an undue deformation and which may be manufactured at a reduced cost.

In accordance with the invention, there is provided a magnetic tape cassette which comprises: an upper and a lower cassette casings joined with each other along their peripheral edges; a pair of reels each having a length of magnetic tape wound therearound; and a pressure spring for urging the reels toward the lower cassette casing, wherein the pressure spring including: a central base portion secured to the upper casing; opposite end portions which are adapted to engage with the reels; canted middle portions defined between the central base portion and the opposite end portions, each of the middle portion joined to the central base portion at its proximal end and to the opposite end portions at its distal end; and a pair of laterally extending rib groups each formed along a limited length of the middle portions in close proximity with the central base portion to face the upper cassette casing.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENTS

Figure 1:
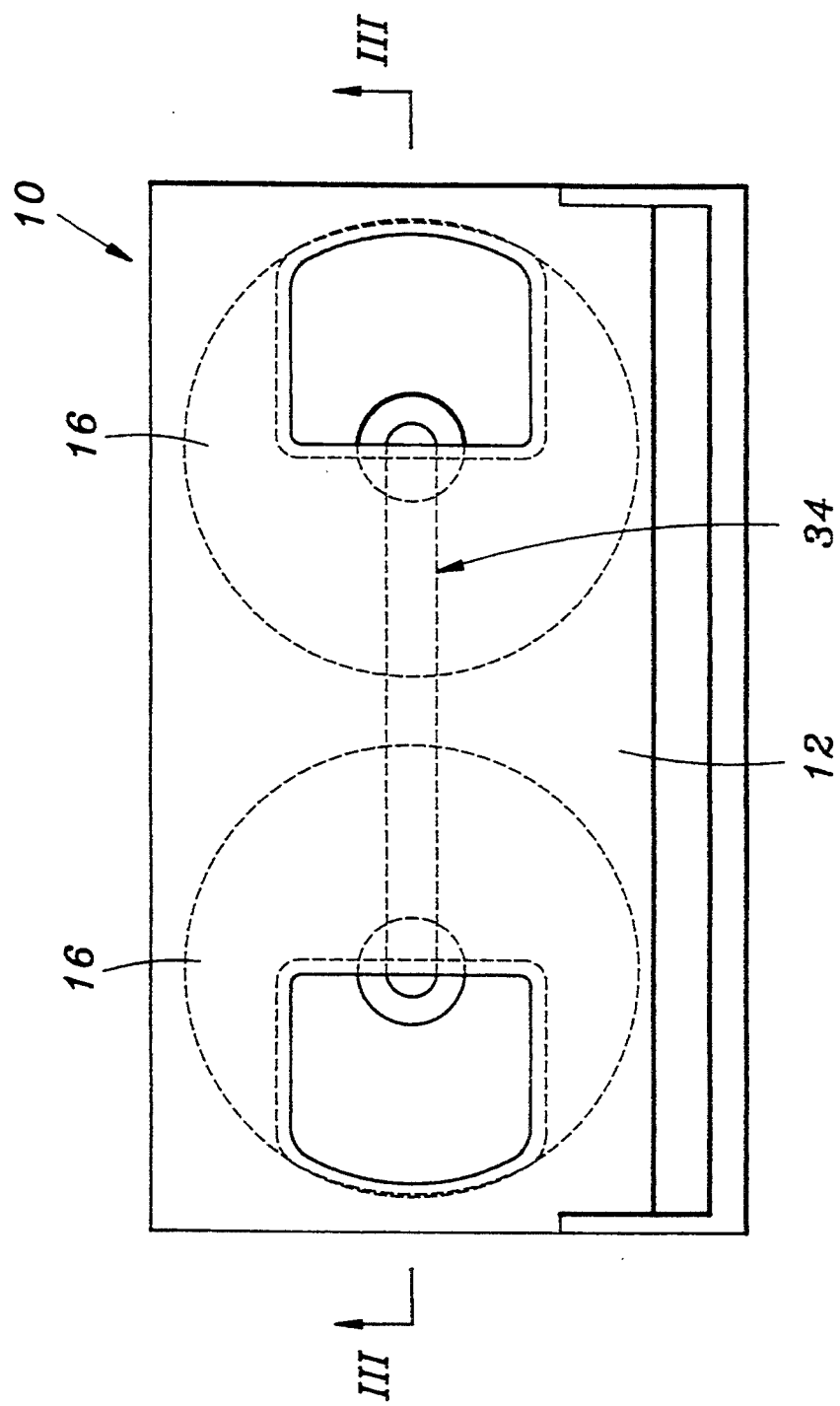
FIG. 1 is a schematic plan view illustrating a videotape cassette employing a pressure spring in accordance with the present invention, with the hidden parts indicated in dotted lines.

Referring to FIG. 1, there is shown a videotape cassette of the instant invention, generally designated by reference numeral 10, which is intended for use in a video tape recorder usually referred to as VCR. As shown, the videotape cassette 10 comprises an upper and a lower cassette casings 12, 14 that may be combined together to form a rectangular box-shaped housing or cartridge.

Figure 3:
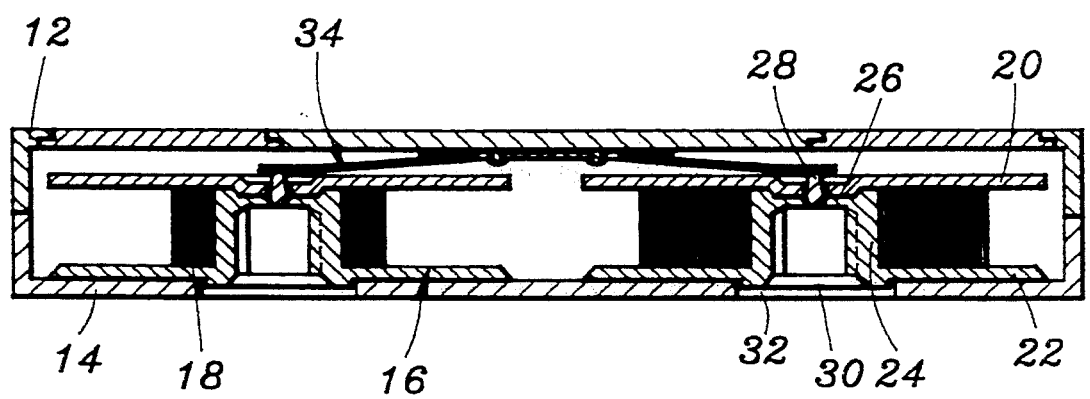
FIG. 3 is a cross-sectional view taken along line III—III of FIG. 1.
Figure 4:
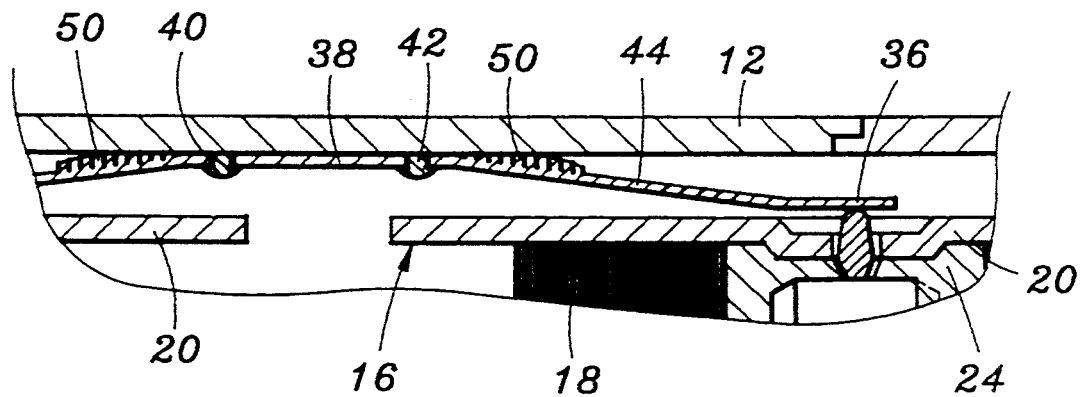
FIG. 4 is an enlarged fragmentary cross-sectional view exposing the pressure spring in more detail.

Contained in the tape cassette is a pair of rotatable reels 16 each carrying a length of videotape 18 wound therearound. As illustrated in FIGS. 3 and 4, each of the reels 16 is provided with a pair of coextensive flanges 20, 22 that remains spaced apart by a hub 24. The hub 24 has a closed top end 26 carrying an upwardly protruding lug 28 which is preferably mounted for pivotal movement and an open bottom end 30 which is roughly aligned with a circular opening 32 of the lower casing 14.

Referring now to FIGS. 1 and 3 together, fixedly secured to the upper casing 12 is a reel pressure spring, generally designated by reference numeral 34, which may be made of an elongated rectangular metal or plastic strip. It should be noted that the pressure spring 34 is oriented along the length of the cassette to resiliently depress the pair of reels 16 against the lower cassette casing, thereby ensuring stable rotation of the reels 16, as will be further set forth hereinbelow.

As best shown in FIG. 4, the pressure spring 34 includes a flat central base portion 38 which is affixed to the inner surface of the upper casing 12. The pressure spring 34 further includes opposite end portions 36 that are designed to abut against the lugs 28. Formed through the central portion 38 are fixture holes 40 through which a pair of bosses 42 extends from the inner surface of the upper casing 12 to hold the pressure spring 34 in position.

Figure 2:
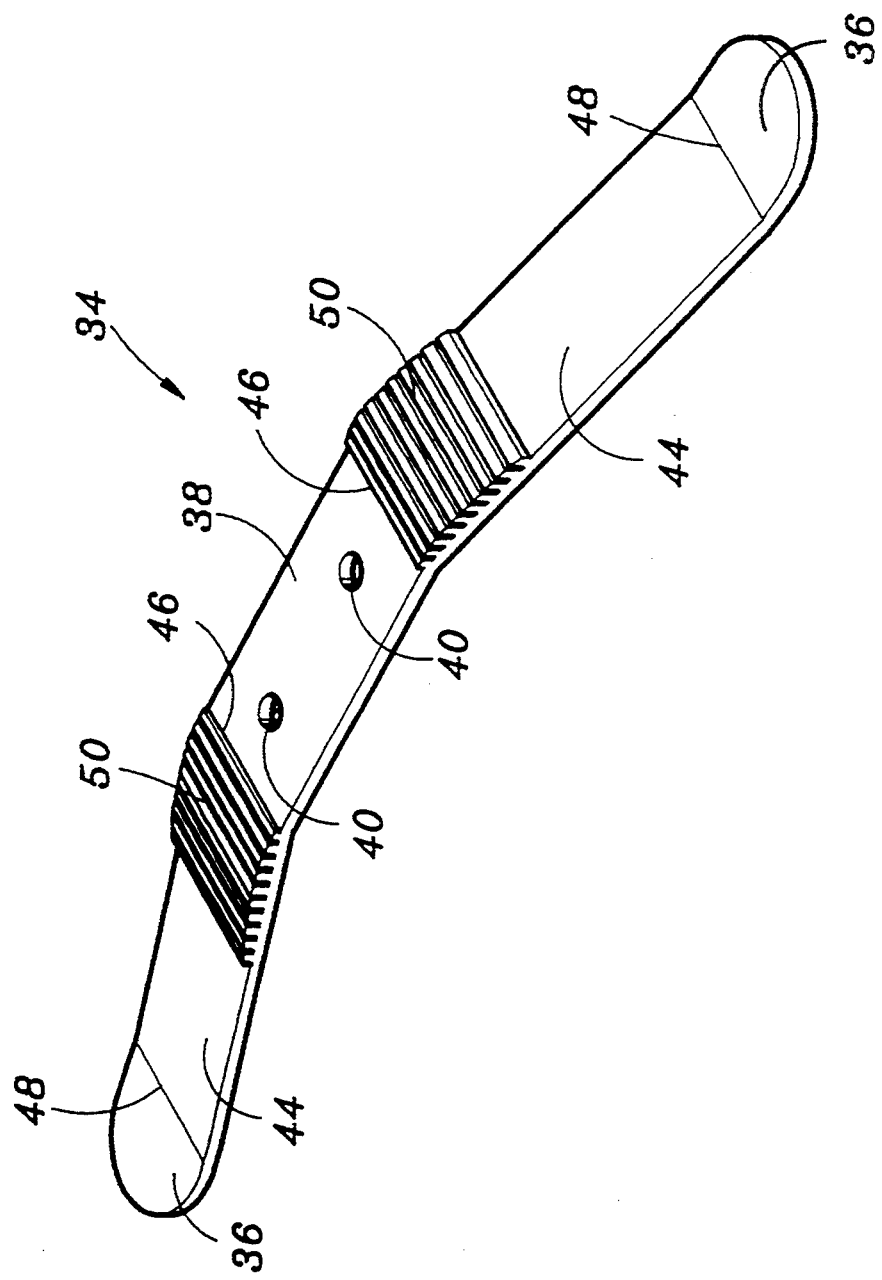
FIG. 2 is an enlarged perspective view showing the pressure spring of the invention.

As clearly illustrated in FIG. 2, the pressure spring 34 is also provided with a pair of inclined middle portions 44 each defined between the central portion 38 and the opposite end portions 36. A pair of first transitions 46 serves to join the central portion 38 to each of the middle portions 44. Provided between the middle portions 44 and the end portions 36 is a pair of second transitions 48 which functions to join them together. In this manner, the first and second transitions 46, 48 will impart an overall curved configuration to the spring 34 so that the opposite end portions 36 are encouraged to exclusively contact with the lugs 28 bulging from the reel hubs 24.

Integrally molded with the middle portions 44 is a pair of laterally extending rib groups 50 which upwardly project to face the inner surface of the upper cassette casing 12. The rib groups 50 are formed along a limited length of the middle portions 44 in the vicinity of the first transitions 46, respectively. As apparently depicted in the cross-sectional view of FIG. 4, each of the rib groups 50 advantageously has a parabolic profile such that the individual ribs located nearer to the central base portion 38 may come into contact with the upper casing 12, while the remaining ribs are kept out of contact therewith. As clearly shown in FIGS. 2–4, individual ribs in each group 50 are arranged closely to each other, to ensure thereby that the ribs in each group cooperate with each other to support the upper casing 12, at least two ribs in each group directly contacting the upper casing. It should be understood that the rib groups 50 enable the pressure spring 34 to have an increased biasing force to a sufficient level to inhibit or minimize any unwanted excessive deformation thereof, which would otherwise adversely affect the stable rotation of the reels and/or the smooth travel of the videotape wound therearound.

The pressure spring 34 may be made of any elastically deformable material, e.g., stainless steel. As an alternative, owing to an increased biasing force of the inventive pressure spring, a synthetic resin such as polyethylene, polyacetal or the like may be used to manufacture the pressure spring.

Although the invention has been shown and described with respect to the exemplary embodiments hereof, it should be understood by those skilled in the art that various changes, omissions, and/or additions may be made without departing from the spirit and scope of the invention as defined by the following claims.

What is claimed is:

1. A magnetic tape cassette including upper and lower cassette casings joined with each other along their peripheral edges; a pair of reels each having a length of magnetic tape wound therearound; and a pressure spring for urging the reels toward the lower cassette casing, the pressure spring comprising:
   a central base portion secured to the upper casing;
   opposite end portions which are adapted to engage with the reels;
   canted middle portions defined between the central base portion and the opposite end portions, each of the middle portions joined to the central base portion at its proximal end and to the opposite end portions at its distal end; and
   a pair of laterally extending rib groups each formed along a limited length of the middle portions in close proximity with the central portion to face the upper cassette casing, the individual ribs of said rib groups being arranged closely with respect to each other to ensure that the ribs cooperate to support the upper casing.

2. The magnetic tape cassette as recited in claim 1, wherein each of the rib groups has a parabolic profile such that individual ribs located adjacent to the central portion come into contact with the upper casing.

3. The magnetic tape cassette as recited in claim 1, wherein said pressure spring is made of an elastically deformable plastic material.

4. The magnetic tape cassette as recited in claim 3, wherein said plastic material is either polyethylene or polyacetal.

5. A magnetic tape cassette including upper and lower cassette casings joined with each other along their peripheral edges; a pair of reels each having a length of magnetic tape wound therearound; and a pressure spring for urging the reels toward the lower cassette casing, the pressure spring comprising:
   a central base portion secured to the upper casing;
   opposite end portions which are adapted to engage with the reels;
   canted middle portions defined between the central base portion and the opposite end portions, each of the middle portions joined to the central base portion at its proximal end and to the opposite end portions at its distal end; and
   a rib group disposed on each middle portion adjacent the proximal end thereof and facing the upper casing, each rib group including a plurality of laterally-extending, longitudinally-spaced ribs at least two of which directly contact the upper casing.

6. The magnetic tape cassette as recited in claim 5, wherein the distal ends of the ribs in each group define a parabolic profile in longitudinal cross-section.

* * * * *